(12) United States Patent
Henry et al.

(10) Patent No.: US 7,618,068 B2
(45) Date of Patent: Nov. 17, 2009

(54) SIPHON ELBOW

(75) Inventors: Tim N. Henry, Marcellus, MI (US); Kenneth C. Lahrke, III, Three Rivers, MI (US)

(73) Assignee: Kadant Johnson, Inc., Three Rivers, MI (US)

( * ) Notice: Subject to any disclaimer, the term of this patent is extended or adjusted under 35 U.S.C. 154(b) by 45 days.

(21) Appl. No.: 11/823,653

(22) Filed: Jun. 28, 2007

(65) Prior Publication Data

US 2009/0001717 A1    Jan. 1, 2009

(51) Int. Cl.
*F16L 27/00* (2006.01)

(52) U.S. Cl. .................... 285/273; 285/279; 285/282

(58) Field of Classification Search ................. 285/273, 285/279, 280, 282, 181, 274
See application file for complete search history.

(56) References Cited

U.S. PATENT DOCUMENTS

| | | | | |
|---|---|---|---|---|
| 1,982 | A | * | 2/1841 | Barrett .................... 239/587.2 |
| 848,223 | A | * | 3/1907 | Campbell .................... 251/345 |
| 906,287 | A | * | 12/1908 | Radler ........................ 285/273 |
| 1,005,407 | A | * | 10/1911 | Brousseau ............... 285/127.2 |
| 1,537,792 | A | | 5/1925 | Aucutt |
| 1,953,525 | A | | 4/1934 | Young |
| 2,000,087 | A | | 5/1935 | Meeker, et al. |
| 2,056,562 | A | | 10/1936 | Bridge |
| 2,146,268 | A | * | 2/1939 | Powell ........................ 15/410 |
| 2,224,857 | A | | 12/1940 | Cram |
| 2,299,530 | A | | 10/1942 | Cram |
| 2,732,228 | A | | 1/1956 | Armstrong |
| 2,820,651 | A | * | 1/1958 | Phillips .................... 285/127.1 |
| 2,862,730 | A | * | 12/1958 | Berger ..................... 285/153.3 |
| 2,875,527 | A | | 3/1959 | Daane |
| 2,887,329 | A | * | 5/1959 | Ward ........................ 285/153.2 |
| 2,978,815 | A | | 4/1961 | Hieronymus |
| 3,204,990 | A | * | 9/1965 | Ward ........................ 285/153.1 |
| 3,312,482 | A | * | 4/1967 | Barrett et al. ............. 285/147.2 |
| 3,473,237 | A | | 10/1969 | McCourt |

(Continued)

FOREIGN PATENT DOCUMENTS

DE            25 53 447         6/1977

(Continued)

*Primary Examiner*—David E Bochna
(74) *Attorney, Agent, or Firm*—Young Basile, P.C.

(57) ABSTRACT

A siphon elbow for pivotally connecting separate horizontal and vertical siphon pipes in fluid communication, comprising a horizontal body and a pivot body. The horizontal body has a first, longitudinally-extending passageway defined therethrough between opposite first and second open ends, the first open end connectable to an end of a horizontal siphon pipe. A second passageway is defined transversely through the horizontal body and intersects the first passageway. The second passageway is at least partially defined by opposite openings in the horizontal body. The pivot body has a passageway defined transversely therethrough between first and second open ends, the second open end being connectable to an end of a vertical siphon pipe. The pivot body is freely rotatably supported within the second passageway of the horizontal body so as to permit the positioning of a vertical siphon pipe connected thereto between a first position, characterized in that the vertical siphon pipe is generally longitudinally aligned with the first, longitudinally extending passageway of the horizontal body, and a second position, characterized in that the vertical siphon pipe is aligned at an angle relative to the first, longitudinally extending passageway of the horizontal body.

7 Claims, 7 Drawing Sheets

U.S. PATENT DOCUMENTS

| | | | |
|---|---|---|---|
| 3,948,283 A | 4/1976 | Asfura et al. |
| 4,590,688 A | 5/1986 | Steffero, Sr. |
| 4,691,452 A | 9/1987 | Ferguson |
| 5,024,266 A | 6/1991 | Critchlow |
| 5,533,569 A | 7/1996 | Reibel et al. |
| 6,203,072 B1 | 3/2001 | Berghuis et al. |
| 7,018,513 B2 | 3/2006 | Smith |

FOREIGN PATENT DOCUMENTS

| | | |
|---|---|---|
| EP | 1 662 191 A1 | 10/2005 |
| FR | 2 805 881 | 9/2001 |
| WO | WO 80/02187 | 10/1980 |

\* cited by examiner

SIPHON ELBOW

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention pertains generally to a siphon elbow of the type used to pivotally connect in fluid communication the separate horizontal and vertical siphon pipes of a siphon system in order to extract fluid from a rotating heat transfer drum such as is employed, for instance, in the paper-making industry. More particularly, the invention pertains to such a siphon elbow comprising a horizontal body connectable to an end of a horizontal siphon pipe, and a pivot body connectable to an end of a vertical siphon pipe. The pivot body is rotatably supported within the horizontal body so as to permit the positioning of a vertical siphon pipe connected thereto between a first position, characterized in that the vertical siphon pipe is generally longitudinally aligned with the horizontal body, and a second position, characterized in that the vertical siphon pipe is aligned at an angle relative to the horizontal body.

BACKGROUND OF THE INVENTION

Papermaking machines typically include three main sections: Forming, pressing and drying. The raw material, called furnish, is largely water, and is converted to sheet form in these three sections. The first section, forming, uses vacuum and other means to remove most of the water. At the same time, the fibers of the sheet are formed into the desired mat. The second section, pressing, removes more water by pressing the sheet between felted rolls. The final section, drying, uses rotating heat transfer drums, also called dryers. These dryers are heated by a heat transfer medium, typically steam. A dryer section usually includes many such dryers arranged in single or multiple tiers. The sheet is threaded through this arrangement of dryers, being heated by the rotating dryers so that most or all of the remaining water is evaporated from the sheet.

Steam introduced into each dryers' cylinder condenses as it cools, and the condensate collects on the inside wall of the cylinder. A siphon system is employed to remove this condensate. The siphon system essentially defines a condensate outlet conduit extending from an inlet end positioned close to the interior surface of the cylinder's inside wall, through and out the dryer's journal and to fixed piping beyond.

In order to allow the siphon system to be inserted into a dryer's cylinder through the narrow passageway defined in the journal and still have the end of the siphon system positioned close to the inside surface of the dryer cylinder, siphon systems typically comprise three main components: A horizontal siphon pipe, so named because it is oriented generally horizontally within the dryer, a vertical siphon pipe, so named because, when deployed in the dryer, it extends at an angle in the vertical plane defined relative to the horizontal siphon pipe, and a siphon elbow which interconnects the two siphon pipes in fluid communication. The siphon elbow is generally comprised of fixed and pivoting components, the pivoting components allowing the vertical siphon pipe to be selectively pivoted between a position where it is longitudinal alignment with the horizontal siphon pipe so that the siphon system can be passed through the passageway in the dryer's journal, and a position where the vertical siphon pipe is oriented at an angle relative to the horizontal siphon pipe so that the inlet end is disposed closer to the dryer cylinder's interior surface.

Previously, siphon elbows made use of pivot pins to connect the fixed and pivoting components thereof. These pivot pins tended to shear or break due to the forces imposed on the elbow during installation, service, or in operation of the dryer.

SUMMARY OF THE DISCLOSURE

Disclosed is a siphon elbow for pivotally connecting separate horizontal and vertical siphon pipes in fluid communication, the siphon elbow comprising a horizontal body and a pivot body. The horizontal body has a first, longitudinally-extending passageway defined therethrough between opposite first and second open ends, the first open end being connectable to an end of a horizontal siphon pipe. A second passageway is defined transversely through the horizontal body and intersecting the first passageway, the second passageway being at least partially defined by opposite openings in the horizontal body.

The pivot body has a passageway defined transversely therethrough between first and second open ends, the second open end being connectable to an end of a vertical siphon pipe. The pivot body is freely rotatably supported within the second passageway of the horizontal body so as to permit the positioning of a vertical siphon pipe connected thereto between a first position, characterized in that the vertical siphon pipe is generally longitudinally aligned with the first, longitudinally extending passageway of the horizontal body, and a second position, characterized in that the vertical siphon pipe is aligned at an angle relative to the first, longitudinally extending passageway of the horizontal body.

In one embodiment thereof, the pivot body is generally cylindrically-shaped and of substantially constant diameter.

Per one feature of this invention, either or both of the horizontal body and the pivot body may be monolithic.

According to still another feature of this invention, a locking retainer is provided to selectively lock the pivot body in the second position thereof. The locking retainer is movable between a first position, wherein the pivot body can rotate in relation to the horizontal body, and a second position, wherein the locking retainer engages the pivot body such that the pivot body cannot rotate in relation to the horizontal body, and wherein further the locking retainer is biased towards the second position of engagement with the pivot body.

Per yet another inventive feature, the locking retainer is moveably disposed within the first passageway of the horizontal body and has a longitudinal passageway defined therethrough between opposite first and second ends to permit fluid communication between the horizontal body first passageway and the pivot body passageway, and wherein, in the second position thereof, the locking retainer second end engages the pivot body first open end such that the pivot body cannot rotate in relation to the horizontal body.

According to a still further feature, the locking retainer may be biased towards the second position of engagement with the pivot body by a spring.

Per yet another feature, corresponding threads are provided on the pivot body first end and the retainer second end. The threads on the retainer second end are threadingly engageable with the threads on the pivot body first end to removably lock the retainer second end in engagement with the pivot body first open end.

Also disclosed is a siphon elbow for pivotally connecting separate horizontal and vertical siphon pipes in fluid communication, comprising a horizontal body connectable to an end of a horizontal siphon pipe, and a pivot body connectable to an end of a vertical siphon pipe, and a locking retainer. The pivot body is freely rotatably associated with the horizontal body so as to permit the positioning of a vertical siphon pipe connected thereto between a first position, characterized in that the vertical siphon pipe is generally longitudinally aligned with the first, longitudinally extending passageway of the horizontal body, and a second position, characterized in that the vertical siphon pipe is aligned at an angle relative to the first, longitudinally extending passageway of the horizontal body. The locking retainer is movable between a first position, wherein the pivot body can rotate in relation to the horizontal body, and a second position, wherein the locking retainer engages the pivot body such that the pivot body cannot rotate in relation to the horizontal body, and wherein further the locking retainer is biased towards the second position of engagement with the pivot body.

In one embodiment thereof, the horizontal body has a first, longitudinally-extending passageway defined therethrough between opposite first and second open ends, the horizontal body first open end connectable to an end of a horizontal siphon pipe; and the pivot body has a passageway defined transversely therethrough between first and second open ends, the second open end being connectable to an end of a vertical siphon pipe. Per this embodiment, the locking retainer is moveably disposed within the first passageway of the horizontal body and has a longitudinal passageway defined therethrough between opposite first and second ends to permit fluid communication between the horizontal body first passageway and the pivot body passageway, and wherein, in the second position thereof, the locking retainer second end engages the pivot body first open end such that the pivot body cannot rotate in relation to the horizontal body.

Per one feature of this invention, a spring biases the locking retainer towards the second position of engagement with the pivot body.

Per still another feature, corresponding threads are provided on the pivot body first end and on the retainer second end, the threads on the retainer second end being threadingly engageable with the threads on the pivot body first end to removably lock the retainer second end in engagement with the pivot body first open end.

BRIEF DESCRIPTION OF THE DRAWINGS

The description herein makes reference to the accompanying drawings wherein like-referenced numerals refer to like parts throughout the several views, and wherein.

DETAILED DESCRIPTION OF EMBODIMENTS OF THE INVENTION

Referring now to the drawings, where like-referenced numerals refer to like or corresponding parts, the siphon-elbow of the present invention is shown and described below.

Figure 1:
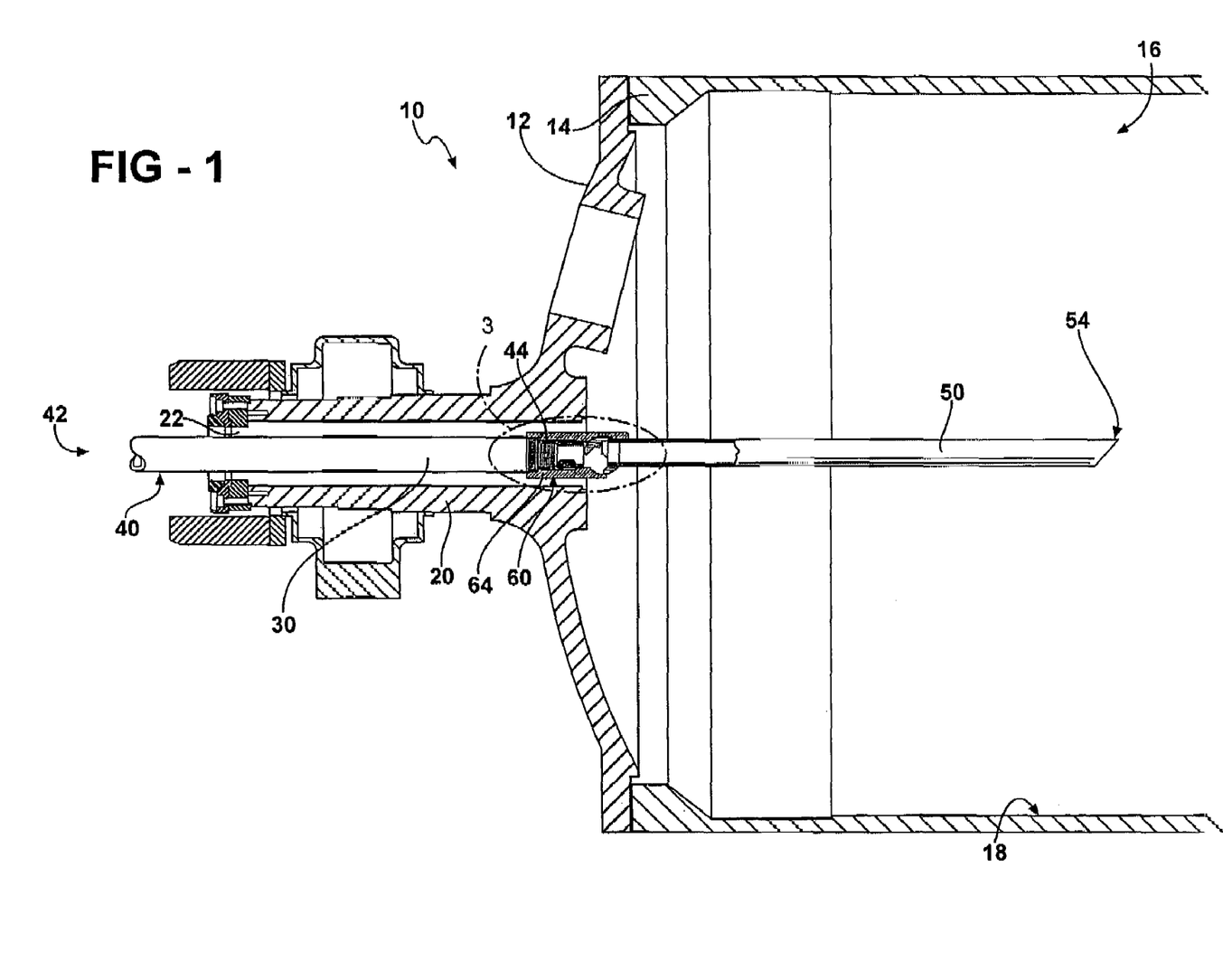
FIG. 1 is a side cut-away view of a dryer with a siphon system utilizing the elbow of the invention, and wherein the vertical siphon tube is illustrated in a first, horizontal position thereof.
Figure 2:
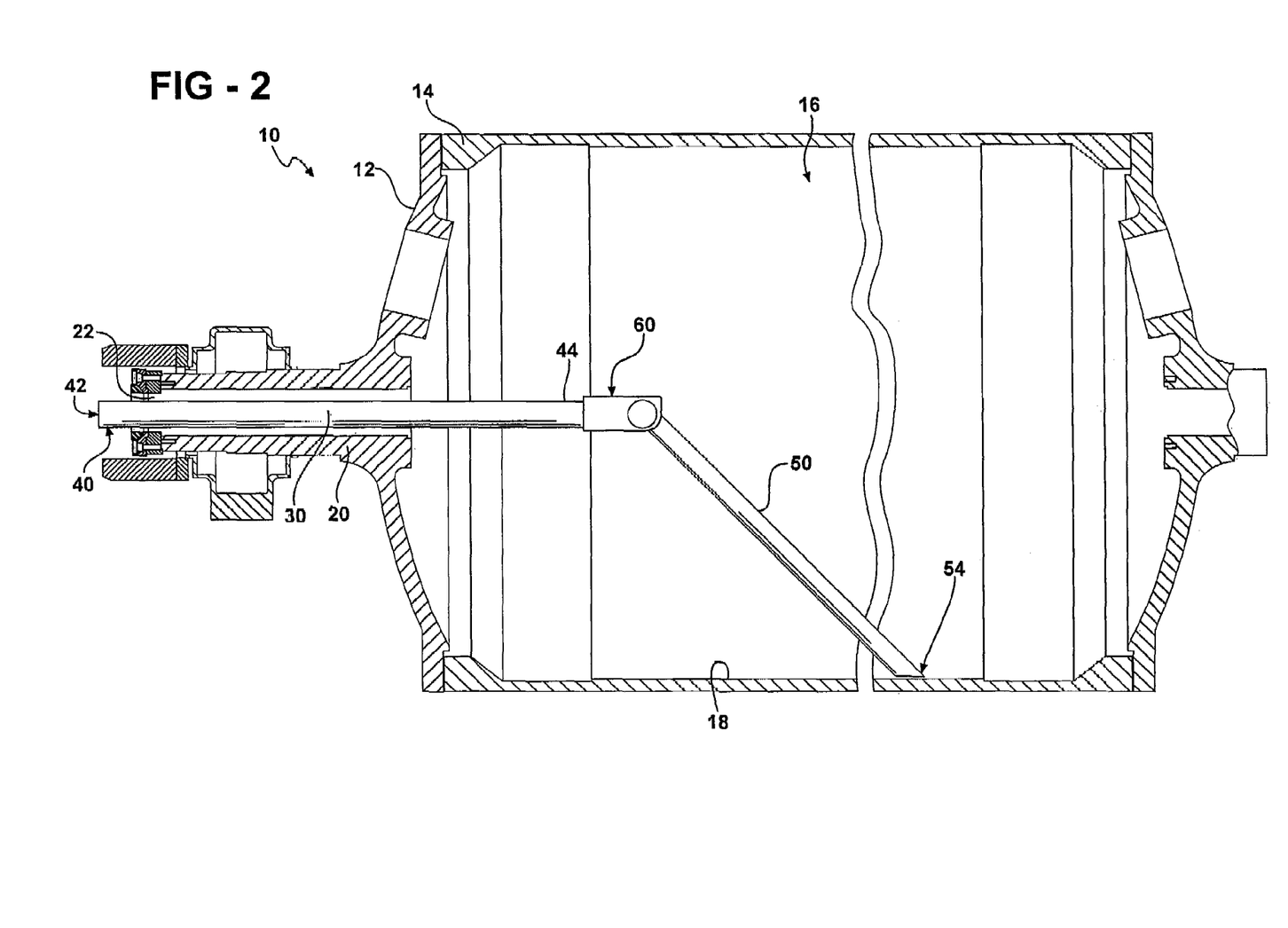
FIG. 2 is a side cut-away view of a dryer with a siphon system utilizing the elbow of the invention, and wherein the vertical siphon tube is illustrated in a second, angled position thereof.

Referring first to FIGS. 1 and 2, the invention is shown, according to an exemplary embodiment thereof, in combination with a dryer 10 of the type used, for example, in the paper-making industry. The dryer 10 comprises a rotating cylinder 12 having a cylinder body 14 with an interior space 16. The cylinder body 14 has an inside surface 18 upon which steam condenses during operation of the dryer 10. The rotating cylinder 12 is coaxially journalled for rotatable support and includes at least one rotary joint at the end of journal 20. Journal 20 is hollow along its axial length, thus defining an internal hollow passageway 22. While this is a generally conventional construction for a steam-heated dryer 10, it will be appreciated by those skilled in the art that the forgoing configuration is exemplary only of the operational environment of the present invention and not intended to be a limitation thereof.

During operation of dryer 10, condensate collects on the inside surface 18 of the cylinder body 14. Siphon assembly 30 removes this condensate. Generally, siphon assembly 30 includes a horizontal siphon pipe 40 and a vertical siphon pipe 50, both of which are connected to, and in fluid-communication via, siphon-elbow 60. Horizontal siphon pipe 40 has a first end 42 connected to an outlet (not shown). The first end 42 of the horizontal pipe can be fixedly connected to the outlet, for example, by being welded, etc., or may alternatively be removably connected to the outlet, for example, by a threaded connection, etc. The horizontal pipe 40 passes through the internal hollow passageway 22 of the dryer journal and terminates at a second end 44 where it is connected to the elbow 60. The horizontal pipe 40 defines a passageway 46 between the first end 42 and the second end 44. The siphon-elbow 60 is attached to the second end 44 of the horizontal pipe 40. Similarly, the vertical siphon pipe 50 is connected to the elbow 60 and, as shown, extends oppositely from the horizontal siphon pipe into the interior space 16 of the cylinder body 14.

Referring now to FIGS. 3-7, the siphon elbow 60 of the present invention generally comprises a horizontal body 62 and a pivot body 80. The horizontal body 62 is, as shown, generally cylindrical in shape, and has a first open end 64, a second open end 66 and a first, longitudinally extending passageway 68 defined therebetween. As will become apparent from the remainder of this specification, the passageway 68 provides for fluid communication between the horizontal and vertical siphon pipes. The first open end 64 is connectable to the second end 44 of the horizontal pipe 40, for example by being welded thereto, threadingly connected thereto, etc. A second passageway 70 at least partially defined by opposite openings 72 in the body 62 is oriented transverse to and intersects the passageway 68. As shown, the openings 72 are generally circular in shape and serve to pivotally support the pivot body 80. In the embodiment as shown, the horizontal body 62 is monolithic and made of a suitable metal such as steel. But while such construction makes the body 62 particularly robust, the horizontal body may also be unitary, comprised of multiple parts. Similarly, other materials may be substituted for steel or other suitable metal, such substitutable materials being known to those skilled in the art.

Still referring to FIGS. 3-7, pivot body 80 is received within the second passageway 70 of the horizontal body 62 through openings 72 and freely rotatably supported therein. The pivot body 80 has a first open end 82, a second open end 84, and a passageway 86 defined therebetween which provides fluid communication between the vertical siphon pipe and the first passageway 68 of the horizontal body 62. The second open end 84 of the pivot body 80 is connectable to a first end 52 of the vertical siphon pipe 50, for instance by welding thereto, by threading interconnection, etc.

In the embodiment as shown, the pivot body 80 is monolithic and made of a suitable metal such as steel. But while such construction makes the body 80 particularly robust, the horizontal body may also be unitary, comprised of multiple parts. Similarly, other materials may be substituted for steel or other suitable metal, such substitutable materials being known to those skilled in the art.

Figure 3:
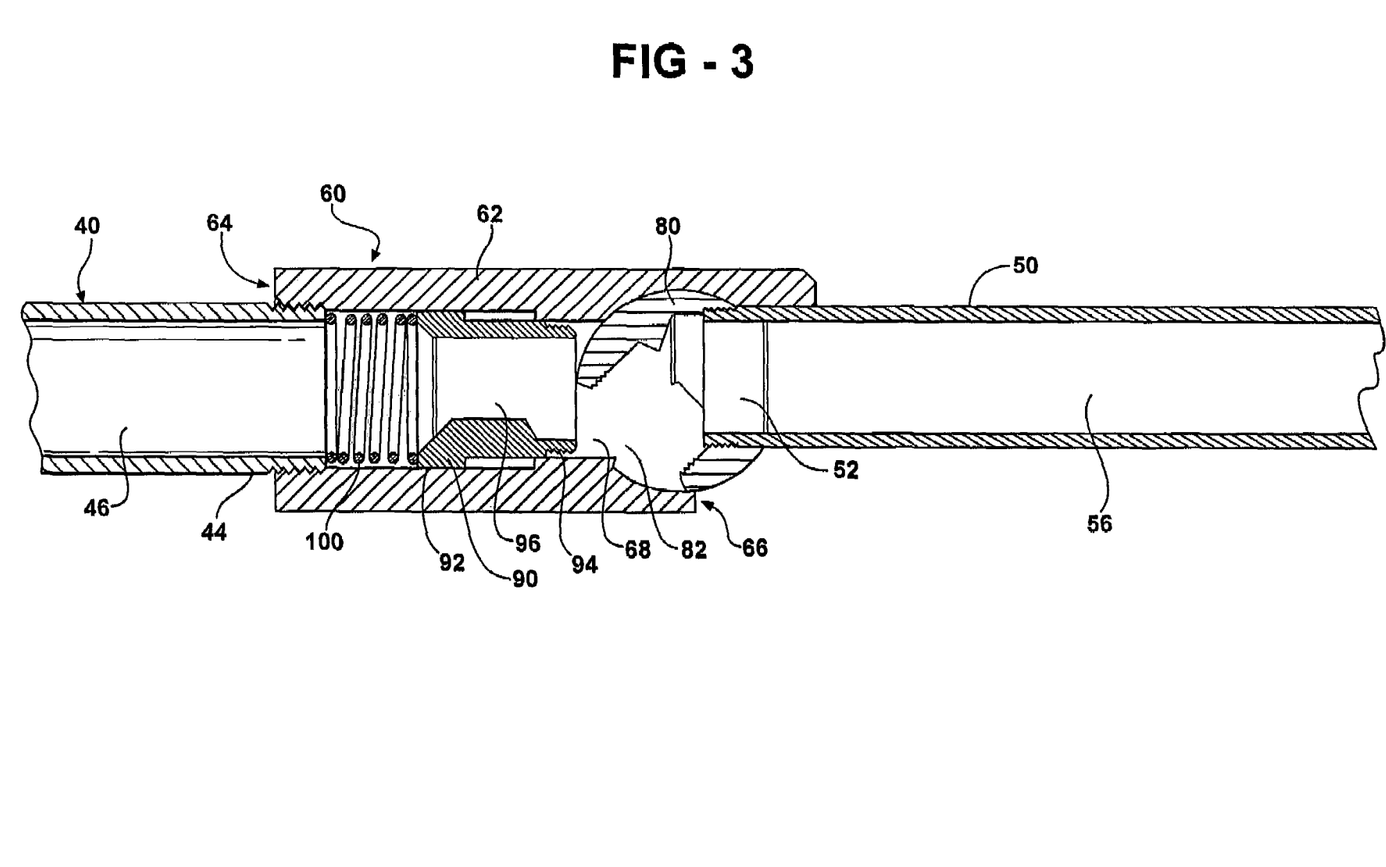
FIG. 3 is a sectional view of the area marked as "3" in FIG. 1, showing a side cut-away view of the elbow when the vertical tube is in the first, horizontal position.
Figure 4:
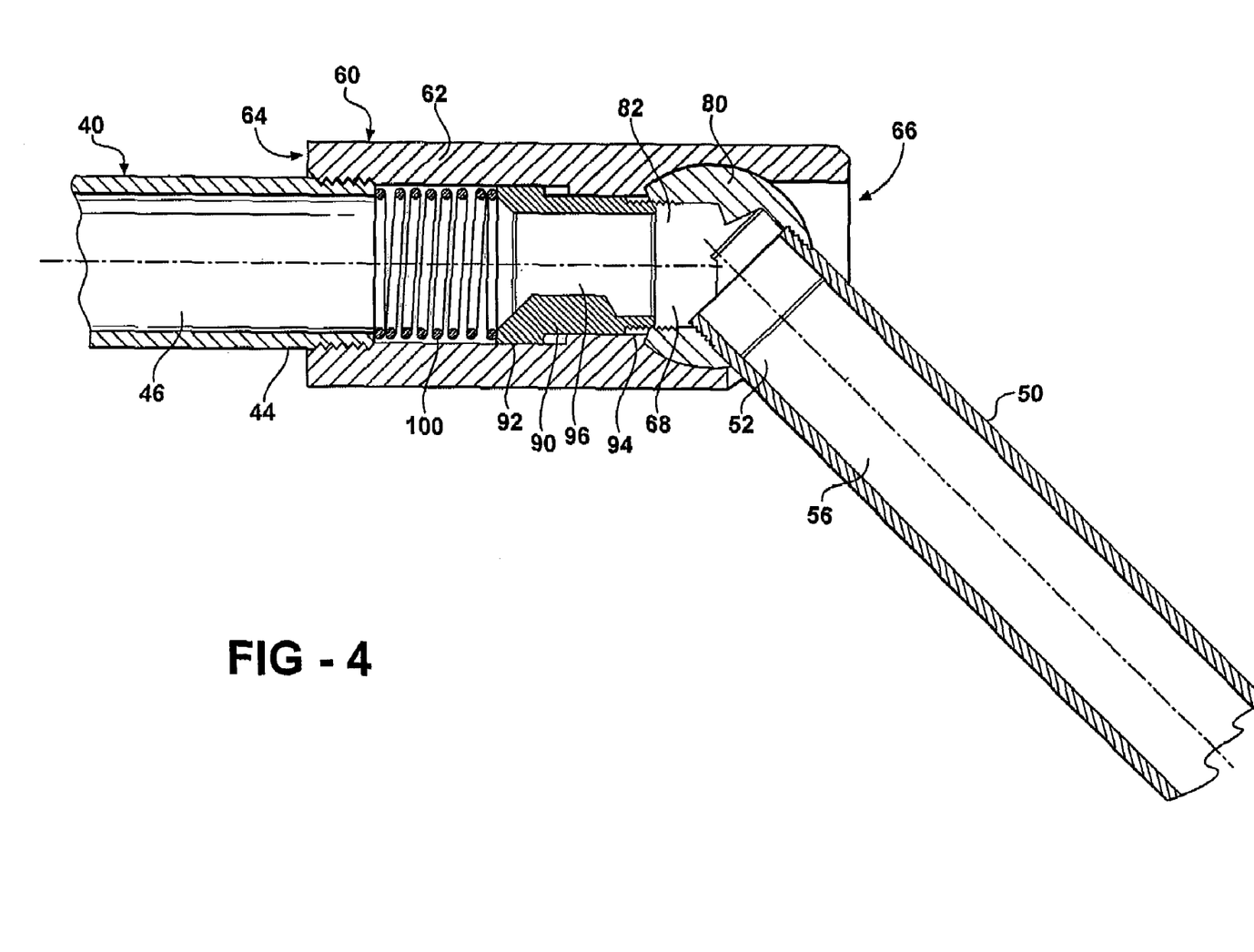
FIG. 4 is a side cut-away view of the elbow when the vertical tube is in the second, angled position and the retainer is spring biased into engagement.
Figure 6:
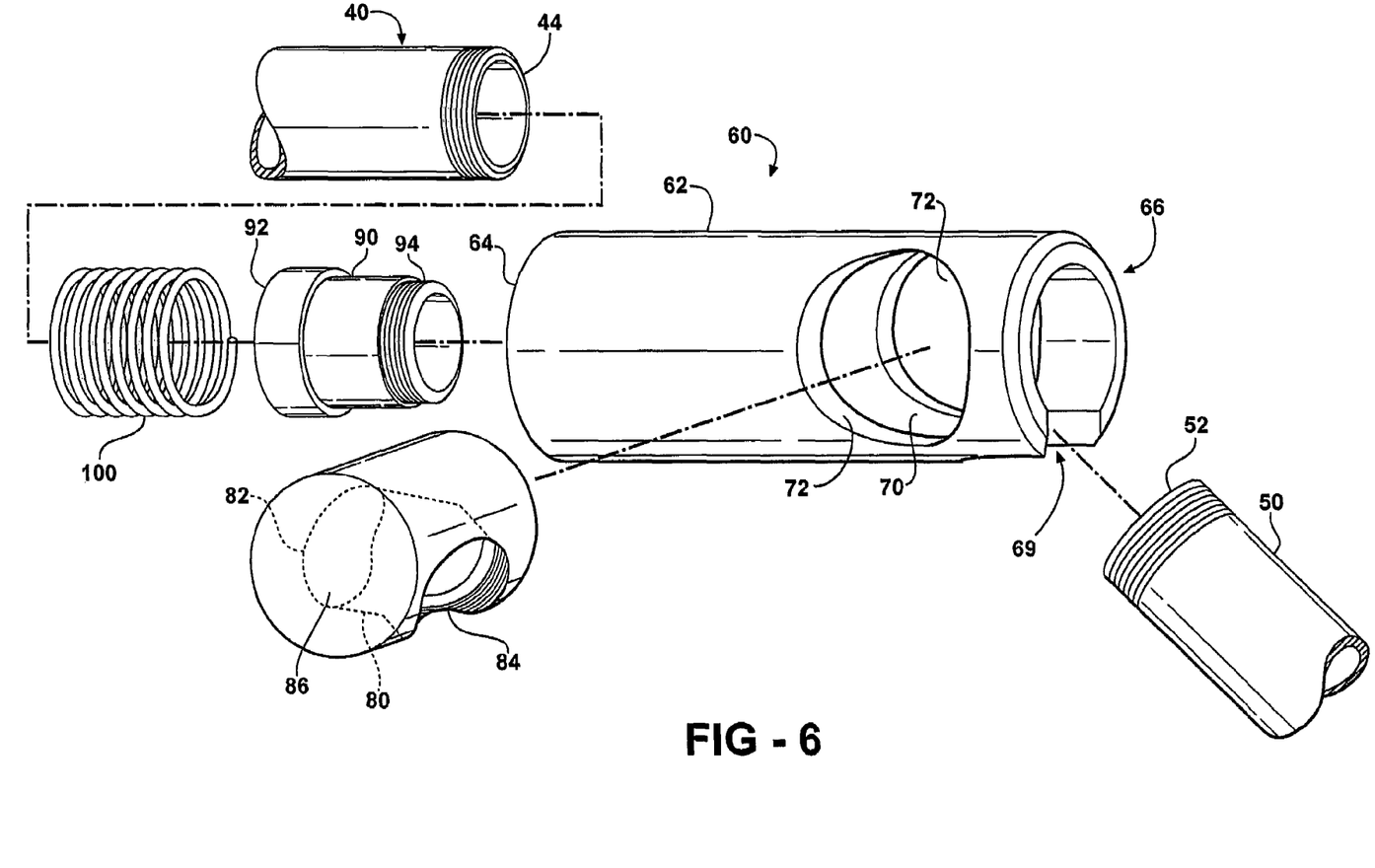
FIG. 6 is an exploded perspective view of the elbow of the invention.
Figure 7:
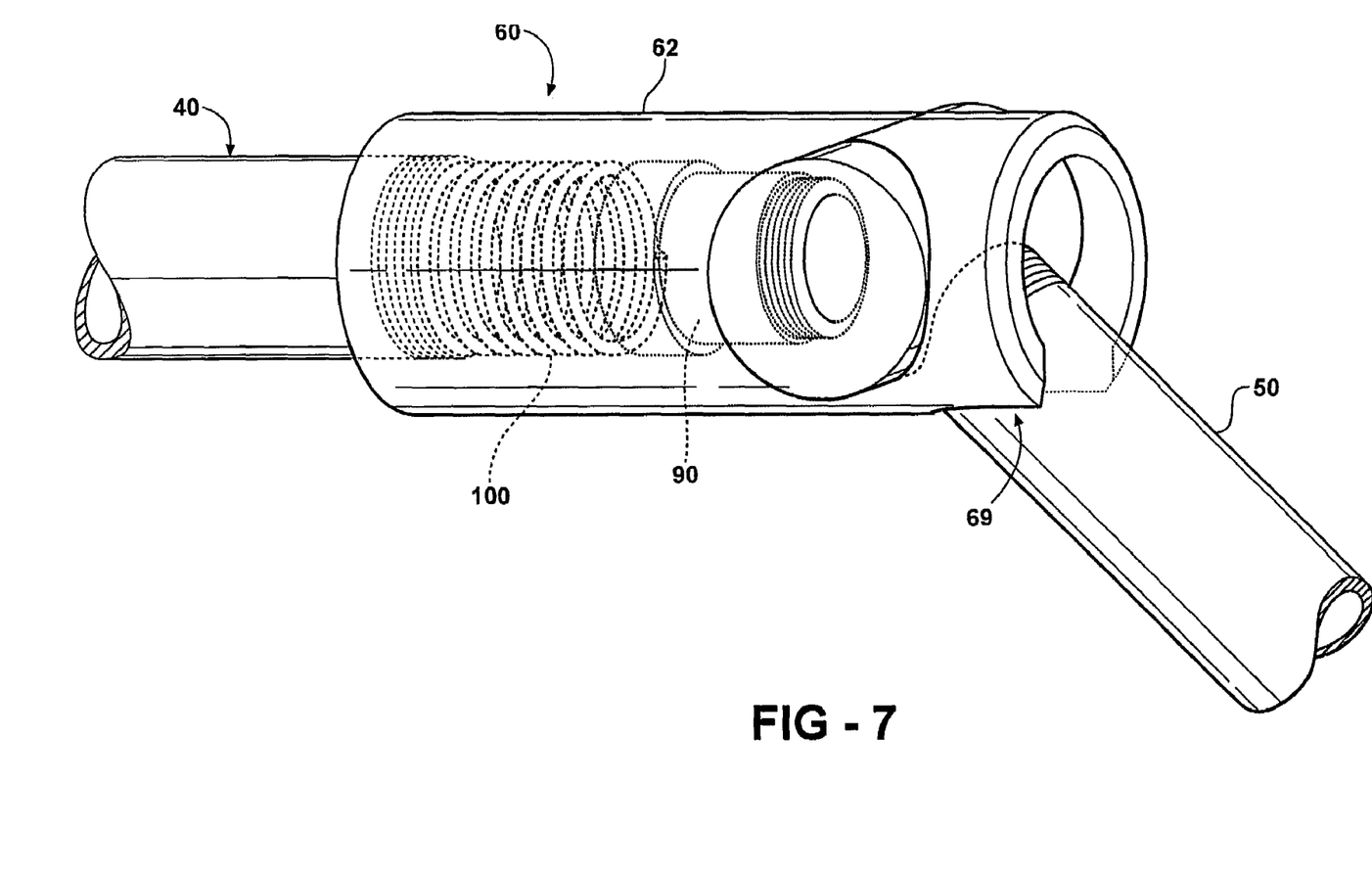
FIG. 7 is a perspective view of the elbow of the invention when the vertical tube is in second, angled position.

Referring also to FIGS. 1 and 2, pivot body 80 is rotatable within the horizontal body 62 to permit the vertical siphon pipe 50 to move between a first, generally horizontal position, as shown in FIGS. 1 and 3, and a second, angled position, as shown in FIGS. 2 and 4. Referring specifically to FIG. 6, It will be appreciated that the extent of permissible rotation of the pivot body 80, and thus angular movement of the vertical siphon pipe 50, may be varied as desired by modifying the dimensions of the slot 69 defined proximate the second end 66 of the horizontal body 62, which slot provides clearance for the vertical siphon pipe 50 as the same rotates into the second position thereof.

To fix the position of the vertical siphon pipe 50 once the same is inside the dryer cylinder and in the second position thereof, a locking retainer 90 may be provided. In the embodiment shown best in FIGS. 3 and 4, locking retainer 90 is disposed in the first passageway 68 of the horizontal body 62. The locking retainer 90 has a first end 92 and a second end 94, with a passageway 96 defined therebetween to provide fluid communication between the horizontal 40 and vertical 50 siphon pipes. Locking retainer 90 is biased to a position of contact with the pivot body 80. In the illustrated embodiment, such biasing is provided by a spring 100 disposed in the first passageway 68 of the horizontal body 62 between the horizontal siphon pipe 40 and the locking retainer 90. In the embodiment shown, the retainer 90 is made of stainless steel to prevent corrosion, though any suitable material which is known in or within the ordinary skill of those in the art may be used.

Figure 5:
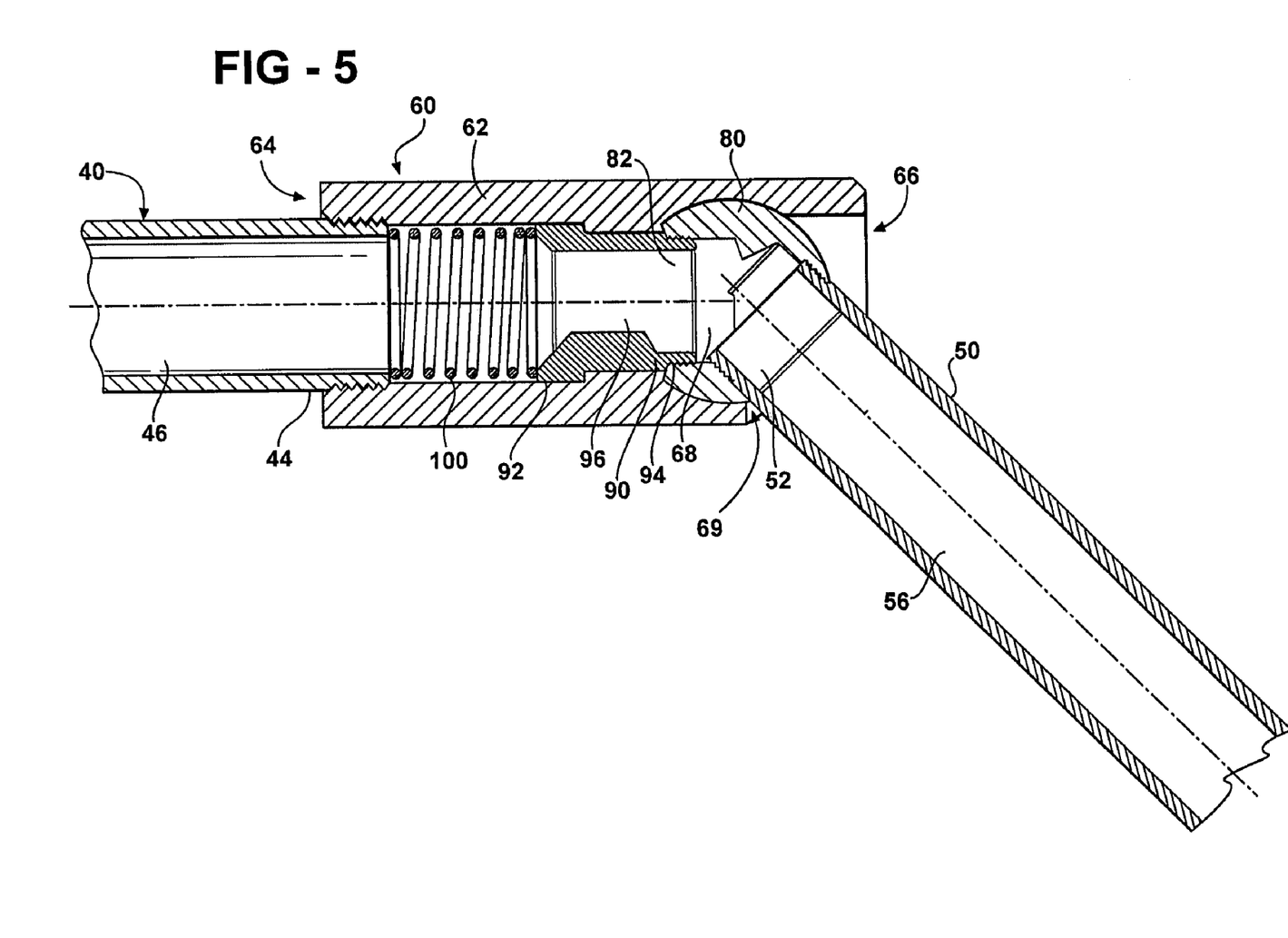
FIG. 5 is a side cut-away view of the elbow when the vertical tube is in the second, angled position and the retainer is in locking engagement.

Referring specifically to FIGS. 3-5, it will be seen that as the vertical siphon pipe 50 rotates from the first position (FIG. 3) to the second position (FIG. 4), the pivot body 80 also rotates from a corresponding first position to a corresponding second position. When the pivot body 80 is in the first position, the retainer 90 is in a corresponding first position, as shown in FIG. 3. In this first position, the locking retainer 90 is biased into contact with the pivot body 80 but does not inhibit the pivot body 80 from rotating. After the pivot body 80 has rotated to its second position, the first open end 82 is oriented in longitudinal alignment with the locking retainer 90. By the bias thereof, the locking retainer 90 is thus urged into the open end 82. As shown, the retainer 90 and first open end 82 may be correspondingly threaded, such that the locking retainer 90 may be threaded, such as by an elongate tool insertable into the horizontal siphon tube 40, into engagement with the pivot body 80 to thereby fix the pivot body in the second position thereof (FIG. 5). Alternatively, the locking retainer 90 and first open end 82 may be smooth-walled, such that the locking retainer is automatically urged into engagement with the open end 82 upon movement of the pivot body 80 into the second position thereof.

As can be seen best from FIG. 4, when the vertical siphon pipe 50 and the pivot body are in their second positions, and the retainer 90 is engaged with the first open end 82 of the pivot body, there exists a continuous fluid pathway from the second end 54 of the vertical siphon pipe 50, through the passageway 56 of the vertical siphon pipe 50, through the passageway 86 of the pivot body 80, through the passageway 96 of the retainer 90, through the passageway 68 of the horizontal body, through the passageway 46 of the horizontal siphon pipe 40, and to the outlet (not shown) by which condensate may be removed from the interior of the dryer (not shown).

Although other variations and modifications of the above disclosure may be presented without departing from the spirit and scope of the novel concepts here presented, the embodiments outlined herein contain in whole or in part the essential features of what is claimed for this dryer section arrangement. While the method has been described in connection with what is presently considered to be the most practical and preferred embodiments, it is to be understood that the method is not to be limited to the disclosed embodiments but, on the contrary, is intended to cover various modifications and equivalent steps and arrangements included within the spirit and scope of the invention and any appended claims.

What is claimed is:

1. A siphon elbow for pivotally connecting separate horizontal and vertical siphon pipes in fluid communication, the siphon elbow comprising:
a monolithic horizontal body having a first, longitudinally-extending passageway defined therethrough between opposite first and second open ends, the horizontal body first open end connectable to an end of a horizontal siphon pipe, and a second passageway defined transversely through said horizontal body and intersecting said first passageway, said second passageway at least partially defined by opposite openings in the horizontal body;
a monolithic pivot body having a passageway defined transversely therethrough between first and second open ends, the second open end being connectable to an end of a vertical siphon pipe, and the pivot body being freely rotatably supported within the second passageway of the horizontal body so as to permit the positioning of a vertical siphon pipe connected thereto between a first position, characterized in that the vertical siphon pipe is generally longitudinally aligned with the first, longitudinally extending passageway of the horizontal body, and a second position, characterized in that the vertical siphon pipe is aligned at an angle relative to the first, longitudinally extending passageway of the horizontal body; further comprising a locking retainer movable between a first position, wherein the pivot body can rotate in relation to the horizontal body, and a second position, wherein the locking retainer engages the pivot body such that the pivot body cannot rotate in relation to the horizontal body, and wherein further the locking retainer is biased towards the second of engagement with the pivot body;

wherein the locking retainer is moveably disposed within the first passageway of the horizontal body and has a longitudinal passageway defined therethrough between opposite first and second ends to permit fluid communication between the horizontal body first passageway and the pivot body passageway, and wherein, in the second position thereof, the locking retainer second end engages the pivot body first open end such that the pivot body cannot rotate in relation to the horizontal body.

2. The siphon elbow of claim 1, further comprising threads provided on the pivot body first end and corresponding threads provided on the retainer second end, wherein the threads on the retainer second end are threadingly engageable with the threads on the pivot body first end to removably lock the retainer second end in engagement with the pivot body first open end.

3. A siphon elbow for pivotally connecting separate horizontal and vertical siphon pipes in fluid communication, the siphon elbow comprising:

a horizontal body having a first, longitudinally-extending passageway defined therethrough between opposite first and second open ends, the horizontal body first open end connectable to an end of a horizontal siphon pipe, and a second passageway defined transversely through said horizontal body and intersecting said first passageway, said second passageway at least partially defined by opposite openings in the horizontal body;

a generally cylindrically-shaped pivot body of substantially constant diameter, said pivot body having a passageway defined transversely therethrough between first and second open ends, the second open end being connectable to an end of a vertical siphon pipe, and the pivot body being freely rotatably supported within the second passageway of the horizontal body so as to permit the positioning of a vertical siphon pipe connected thereto between a first position, characterized in that the vertical siphon pipe is generally longitudinally aligned with the first, longitudinally extending passageway of the horizontal body, and a second position, characterized in that the vertical siphon pipe is aligned at an angle relative to the first, longitudinally extending passageway of the horizontal body, said siphon elbow further comprising a locking retainer movable between a first position, wherein the pivot body can rotate in relation to the horizontal body, and a second position, wherein the locking retainer engages the pivot body such that the pivot body cannot rotate in relation to the horizontal body, and wherein further the locking retainer is biased towards the second position of engagement with the pivot body, and wherein the locking retainer is moveably disposed within the first passageway of the horizontal body and has a longitudinal passageway defined therethrough between opposite first and second ends to permit fluid communication between the horizontal body first passageway and the pivot body passageway, and wherein, in the second position thereof, the locking retainer second end engages the pivot body first open end such that the pivot body cannot rotate in relation to the horizontal body.

4. The siphon elbow of claim 3, further comprising threads provided on the pivot body first end and corresponding threads provided on the retainer second end, wherein the threads on the retainer second end are threadingly engageable with the threads on the pivot body first end to removably lock the retainer second end in engagement with the pivot body first open end.

5. A siphon elbow for pivotally connecting separate horizontal and vertical siphon pipes in fluid communication, comprising:

a horizontal body connectable to an end of a horizontal siphon pipe;

a pivot body connectable to an end of a vertical siphon pipe, the pivot body freely rotatably associated with the horizontal body so as to permit the positioning of a vertical siphon pipe connected thereto between a first position, characterized in that the vertical siphon pipe is generally longitudinally aligned with the first, longitudinally extending passageway of the horizontal body, and a second position, characterized in that the vertical siphon pipe is aligned at an angle relative to the first, longitudinally extending passageway of the horizontal body; and a locking retainer movable between a first position, wherein the pivot body can rotate in relation to the horizontal body, and a second position, wherein the locking retainer engages the pivot body such that the pivot body cannot rotate in relation to the horizontal body, and wherein further the locking retainer is biased towards the second position of engagement with the pivot body;

wherein said horizontal body has a first, longitudinally-extending passageway defined therethrough between opposite first and second open ends, the horizontal body first open end connectable to an end of a horizontal siphon pipe; and said pivot body has a passageway defined transversely therethrough between first and second open ends, the second open end being connectable to an end of a vertical siphon pipe; and said locking retainer is moveably disposed within the first passageway of the horizontal body and has a longitudinal passageway defined therethrough between opposite first and second ends to permit fluid communication between the horizontal body first passageway and the pivot body passageway, and wherein, in the second position thereof, the locking retainer second end engages the pivot body first open end such that the pivot body cannot rotate in relation to the horizontal body.

6. The siphon elbow of claim 5, further comprising a spring which biases the locking retainer towards the second position of engagement with the pivot body.

7. The siphon elbow of claim 5, further comprising threads provided on the pivot body first end and corresponding threads provided on the retainer second end, wherein the threads on the retainer second end are threadingly engageable with the threads on the pivot body first end to removably lock the retainer second end in engagement with the pivot body first open end.

* * * * *